US009787436B2

(12) United States Patent
Major et al.

(10) Patent No.: US 9,787,436 B2
(45) Date of Patent: Oct. 10, 2017

(54) WI-FI ROUTING

(71) Applicant: ECHOSTAR TECHNOLOGIES L.L.C., Englewood, CO (US)

(72) Inventors: Robert Drew Major, Orem, UT (US); Darren Major, Pleasant Grove, UT (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/788,463

(22) Filed: Jun. 30, 2015

(65) Prior Publication Data

US 2016/0183101 A1    Jun. 23, 2016

Related U.S. Application Data

(60) Provisional application No. 62/018,892, filed on Jun. 30, 2014.

(51) Int. Cl.
| | |
|---|---|
| *H04L 1/18* | (2006.01) |
| *H04L 1/08* | (2006.01) |
| *H04W 84/12* | (2009.01) |
| *H04L 29/08* | (2006.01) |
| *H04L 12/26* | (2006.01) |
| *H04L 12/801* | (2013.01) |
| *H04W 40/16* | (2009.01) |

(52) U.S. Cl.
CPC ............. *H04L 1/08* (2013.01); *H04L 67/28* (2013.01); *H04W 84/12* (2013.01); *H04L 43/0829* (2013.01); *H04L 47/10* (2013.01); *H04W 40/16* (2013.01)

(58) Field of Classification Search
CPC ................................................ H04L 1/18
USPC .................... 714/748, 749, 752, 747
See application file for complete search history.

(56) References Cited

U.S. PATENT DOCUMENTS

| | | | |
|---|---|---|---|
| 6,377,782 B1* | 4/2002 | Bishop | G09B 7/073 434/307 R |
| 9,137,262 B2* | 9/2015 | Qureshi | H04L 63/20 |
| 2008/0195743 A1 | 8/2008 | Brueck et al. | |
| 2012/0257585 A1* | 10/2012 | Sydor | H04W 72/082 370/329 |
| 2016/0036467 A1 | 2/2016 | Babaei et al. | |
| 2016/0162374 A1* | 6/2016 | Mutha | G06F 3/06 714/19 |

* cited by examiner

*Primary Examiner* — Fritz Alphonse
(74) *Attorney, Agent, or Firm* — LK Global

(57) ABSTRACT

Routing on Wi-Fi or similar home networks is improved though the use of a proxy service located on the home network. If wireless networking issues arise, the proxy can adapt delivery of digital content in an intelligent manner. If client communications are becoming increasingly unreliable, for example, the proxy can respond with additional error correction and/or packet retransmissions, in contrast to conventional TCP techniques for responding to network issues. Other corrections and features may be built into the proxy protocol as desired.

15 Claims, 2 Drawing Sheets

WI-FI ROUTING

PRIORITY CLAIM

Figure 1:
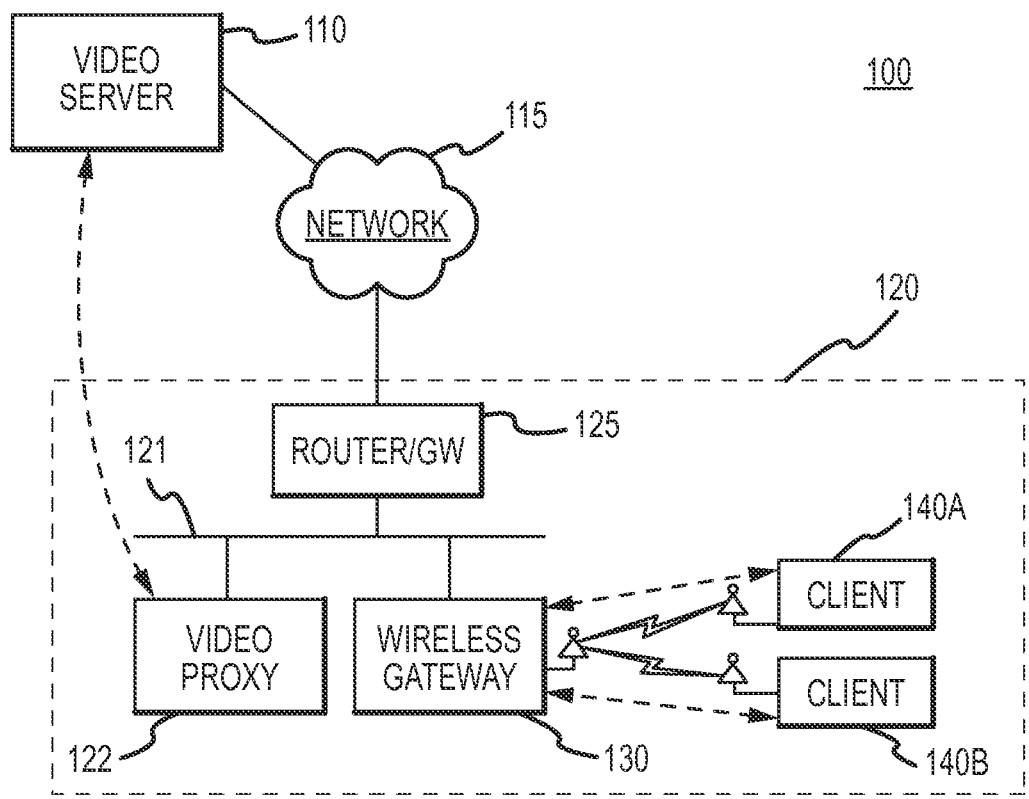

This application claims priority to U.S. Provisional Application Ser. No. 62/018,892 filed on Jun. 30, 2014, which is incorporated herein by reference.

TECHNICAL FIELD

The present disclosure generally relates to delivery of data over a local area networks. More particularly, the following discussion relates to systems and processes for efficiently delivering data over a Wi-Fi or similar wireless network.

BACKGROUND

Media streaming is becoming an increasingly popular way of delivering television, movies and other media content to viewers. Media streams are typically point-to-point transmissions of digitized content that can be sent over the Internet or a similar network. Media streaming is often used to facilitate video on demand (VOD) services, local storage and/or remote storage digital video recorder (LSDVR and/or RSDVR) services, Internet Protocol television (IPTV) services, placeshifted media viewing and/or any number of other convenient services. Generally, the media stream is played back for the viewer in real time as the stream continues to be delivered to the player.

Often, media content is encoded into multiple sets of "streamlets" or other smaller segment files that can be individually requested and adaptively delivered to client devices. As changes in network bandwidth or other factors occur, the client device is able to react to the changes by requesting future segments that are encoded with different parameters (e.g., a higher or lower bit rate) for increased or decreased quality, as desired. Adaptive media streaming typically relies upon the media player client to control much of the streaming process. That is, the media player client, rather than the server, typically determines the next segment of the stream that will be requested and delivered to the player. Several examples of adaptive streaming systems, devices and techniques are described in US Patent Publication No. 2008/0195743, which is incorporated herein by reference as one example of an adaptive media streaming system.

Many devices now communicate with the network via IEEE 802.14 ("Wi-Fi") or similar wireless networks. While such networks continue to evolve with faster data throughput and improved signal modulation, data communication over a Wi-Fi or similar network is still dependent upon underlying protocols such as the transmission control protocol (TCP) or the like. Legacy protocols such as TCP often assume that packet loss and other network problems are caused by overloaded routers or gateways, thereby necessitating reduced packet transmissions to avoid congestion. The assumption that network problems emanate from congestion, however, may not be accurate for wireless networks. Although congestion can also occur on wireless networks, data transmission problems can also occur due to signal attenuation, interference and other issues associated with radio frequency (RF) transmissions.

It is therefore desirable to create systems, devices and processes that allow more efficient and effective delivery of video content or other data to clients residing on Wi-Fi or similar wireless networks. These and other desirable features and characteristics will become apparent from the subsequent detailed description and the appended claims, taken in conjunction with the accompanying drawings and this background section.

BRIEF DESCRIPTION

The following discussion relates to various example implementations of systems, devices and processes that can efficiently process data delivery over wireless networks. Generally speaking, a proxy device residing on a wired or toher local area network receives data requests from one or more client devices operating on a wireless network. The proxy obtains requested data on behalf of the client device and delivers the requested data to the client device using a protocol that adapts transmissions as appropriate to address issues in the wireless network. Packet loss due to radio frequency interference, signal attenuation, distance between the wireless access point and the client device, and/or other factors can be addressed by increasing packet retransmits, for example, rather than reducing packet transmissions as would be expected in conventional TCP protocols. These concepts may be implemented in computer systems, set top boxes (STB), video game players, media players, digital video recorders, placeshifting devices and/or other components residing on local area networks within home, office or other customer premises as desired.

Some implementations provide data processing systems comprising an interface to a local area network and a processor. The processor is suitably programmed or otherwise configured to receive requests for identified content from a client device, to obtain the identified content from a network service via the interface, and to forward the identified content to the client device via the interface, wherein the client device communicates with the local area network via a wireless network connection, and wherein the forwarding comprises adapting transmissions of the identified content to compensate for irregularities in the wireless network connection. The compensation may comprise increasing the number of data packets sent over the wireless network connection, increasing an amount of forward error correction (FEC) applied to traffic over the wireless network connection, any combination of retransmissions and FEC, and/or any other techniques as desired.

Other embodiments provide computer-implemented processes to deliver media content to client devices operating on wireless networks via a proxy. The method executable by the proxy system suitably includes receiving requests for identified content from a client device via a local area network; obtaining the identified content from a network service; and forwarding the identified content to the client device via the interface, wherein the client device communicates with the local area network via a wireless network connection, and wherein the forwarding comprises adapting transmissions of the identified content to compensate for irregularities in the wireless network connection. Once again, the compensation may comprise increasing the number of data packets sent over the wireless network connection, increasing an amount of forward error correction (FEC) applied to traffic over the wireless network connection, any combination of retransmissions and FEC, and/or any other techniques as desired.

Other embodiments provide a method executable by a proxy device to improve data transmissions on a wireless network. The method suitably comprises receiving a request for media content from a client device, wherein the request is transmitted to the proxy device at least in part via a wireless network; responding to the request by requesting a segment of a media stream from a media server; upon receiving the requested segment of the media stream, transmitting the received segment to the client device at least in part via the wireless network; monitoring the delivery of the requested segment to identify any issues with the wireless network; and, if issues are identified with the wireless network, retransmitting the received segment to thereby increase the amount of traffic on the wireless network.

Still other embodiments provide additional processes, systems and devices for obtaining and processing video or other digital content. The examples presented in this summary may be modified or augmented in any manner, and many additional examples are described below.

BRIEF DESCRIPTION OF THE DRAWING FIGURES

Figure 2:
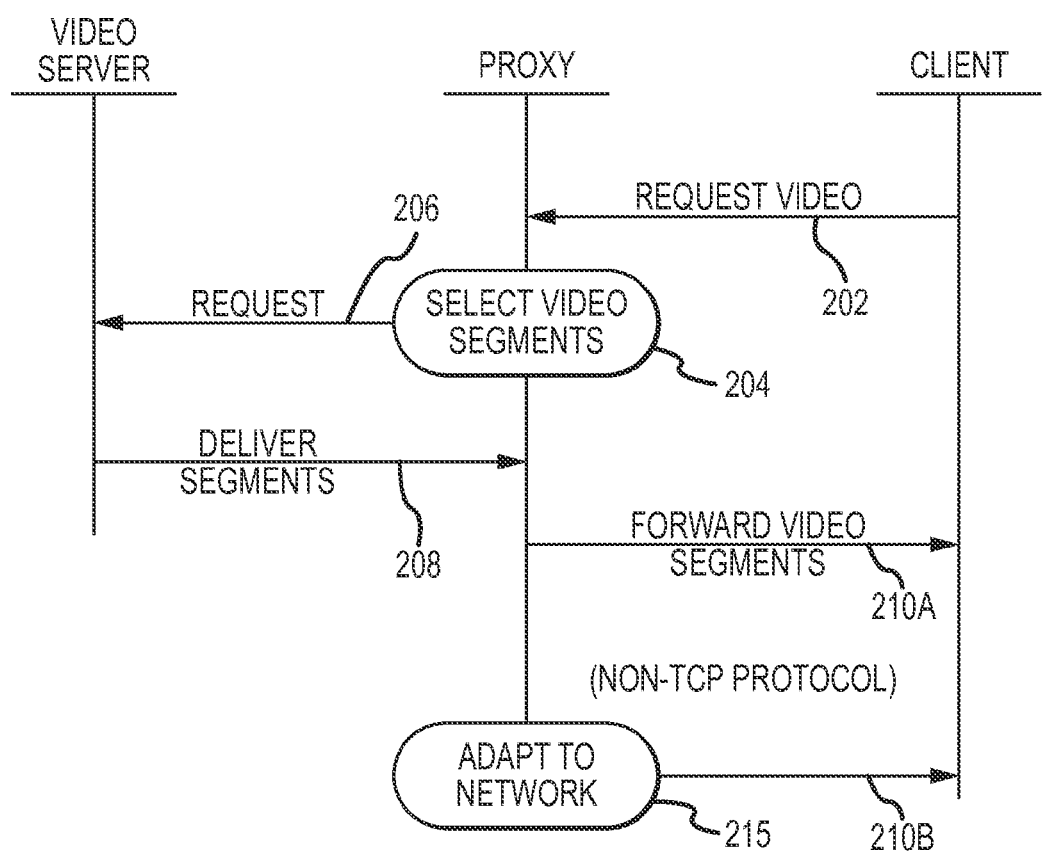

Exemplary embodiments will hereinafter be described in conjunction with the following drawing figures, wherein like numerals denote like elements, and FIG. 1 is a block diagram of an example home or office network that uses a proxy to relay requested data to one or more client devices; and FIG. 2 is a diagram of an example process for delivering data to a client device via a proxy server.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

As noted above, wireless networks such as IEEE 802.14 ("Wi-Fi") networks and the like can exhibit somewhat unusual error characteristics under various conditions. Errors can occur, for example, when the communicating node is a relatively great distance from the wireless access point, when radio density interference is present, when sources of attenuation (e.g., walls) are present between the transmitter and receiver, or in many other situations. In each of these cases, data packets transmitted on the wireless network can become lost or corrupted, thereby leading to less-than-optimal network performance.

Typically, packet loss is addressed by a transport layer protocol such as the well-known transmission control protocol (TCP), which is described in detail in Internet RFC 793. TCP, which was developed primarily for wired networks, typically assumes that packet loss is caused by congestion of the network or an associated router. Moreover, TCP is greatly concerned with "data storms" wherein multiple nodes on a network simultaneously attempt retransmissions during periods of congestion, thereby resulting in even more congestion. TCP's typically response to congestion, then is to dramatically reduce the amount of traffic on the congested network in hopes of avoiding a data storm. When data transmission issues (e.g., lost packets) are identified, TCP typically backs off of transmitting additional network packets to alleviate the assumed congestion and thereby reduce the amount of traffic generated on the network.

In the case of wireless networks, however, reducing transmissions in the face of lost packets or other transmission issues can be counter productive. As noted previously, packet loss on a wireless network is not typically caused by network congestion, but rather by RF interference or attenuated RF signals resulting from objects and/or relatively long distances between the transmitter and receiver. In either case, the preferred remedy is not to reduce the amount of traffic; to the contrary, it is generally preferable to increase the amount of redundancy under such conditions, thereby improving the chances that a complete message will be transmitted. Redundancy may be achieved by transmitting multiple copies of the same packet, or through any number of forward error correction (FEC) techniques in which redundancy packets are transmitted to improve the probability that the recipient will receive enough data to re-constitute the transmitted data. Access points and wireless clients typically make use of TCP and similar protocols for backward compatibility and for wide adoption, noting that TCP protocols and the like have been widely supported for several decades.

For certain applications, however, it can be desirable to provide a proxy service on a reliable network that is able to obtain and relay data on behalf of a node operating on a wireless network. When issues with the wireless network arise, the proxy can adapt to the issues by increasing redundancy or the like while retaining compatibility with the underlying network structures. A local storage digital video recorder (LSDVR) or other network device operating on a local area network, for example, can adaptively obtain and deliver video streams to wireless nodes using a proprietary or open protocol that is better suited to modern wireless networks than TCP or other legacy protocols.

FIG. 1, for example, shows a system 100 in which one or more client devices 140A-B receive video or other digital data from a network server 110 operating on the Internet or another wide area network 115 via a proxy system 122 located within the home, office or other local network 120. In the example of FIG. 1, an Internet router or gateway device 125 suitably provides an interface between network 120 and the WAN 115, as would be typical in a home, office or other customer premises environment. An IEEE 802.11 ("Ethernet") or similar LAN typically connects router 125 to a wireless access point or other wireless gateway 130 that communicates with any number of wireless network client devices 140A-B. Client devices 140A-B may include computer systems, mobile phones, tablet computer systems, personal digital assistants, video game players, media players and/or any number of other components or devices as desired. The example network 120 may be enhanced or modified in many different ways to incorporate additional devices, nodes and/or networks (including any number of wired or wireless networks) as appropriate.

In the example of FIG. 1, a proxy server 122 resides on the Ethernet or other wired LAN 121 to provide fast and reliable communication to router 125. Other embodiments could locate server 122 on any other portion of network 120, including on a dedicated or otherwise reliable wired or wireless network, as desired. Proxy server 122 is implemented with any conventional computing hardware, such as a personal computer, digital video recorder, set top box, television receiver or other computing device that includes conventional processing circuitry, memory, input/output interfaces and the like. To that end, proxy server 122 includes appropriate processing hardware, software/firmware and interface capabilities to communicate on network 121 and to perform the various functions described herein. In various embodiments, proxy server 122 may be dedicated entirely to the proxy functions described herein; in other embodiments, server 122 may be incorporated into another device that provides television reception, digital video recording, media playing, video game playing and/or other functions as desired. A television set top box (STB) or digital video recorder (DVR) device, for example, may be physically coupled to a router or gateway 125 via an Ethernet or other wired network, and such a device also act as a video proxy 122 as described herein. Such a device could also incorporate its own wireless gateway 130, if desired.

In operation, proxy server 122 executes software or firmware instructions to direct the network interface of the server 122 to perform various functions. In various embodiments, the proxy server 122 receives requests from one or more clients 140A-B operating on one or more wireless networks. These requests typically identify video or other digital content to be delivered to the requesting client 140A-B. The requested content may reside on a remote server 110 operating on network 115, on a DVR or other server operating within network 120, or even content stored on the same device 122 that provides the proxy service depending upon the particular embodiment. The proxy system 122 suitably obtains the requested content and delivers it to the requesting client devices 140A-B, as desired. Various embodiments could further implement storage features such as caching of future segments of video files, or other optimizations and features as desired.

As noted above, the proxy is able to implement a protocol in communicating with the wireless devices 140A-B that adapts and accommodates common issues in wireless networking. Rather than reducing the number of packets transmitted in response to observed packet loss, for example, the proxy server 122 is able to increase the number of packets transmitted and/or to increase the amount of redundancy data so that transmission over the wireless network is more effective. In contrast to many current video streaming systems that are unable to respond to difficulties in wireless networking or that are primarily concerned with network congestion, various embodiments are able to adapt and improve communication even as issues arise in wireless networking. This can greatly improve the actual and perceived performance of the video streaming system, thereby improving customer satisfaction.

FIG. 2 shows an example process 200 executable by proxy system 122 to deliver video or other data segments to client devices 140 located on a wireless network. The various functions illustrated in FIG. 2 may be carried out in software or firmware stored in memory and executed by a processor associated with proxy system 122, as appropriate. The various functions shown in process 200 may be supplemented, modified or differently arranged in any manner.

As shown in FIG. 2, the client device 140 suitably selects digital content and provides a request 202 to proxy device 122 via the wireless network. The proxy device may select the actual segments of the requested video stream, as shown in FIG. 2 (function 204). In other embodiments, the particular segments may be selected by the media player client 140, and the segments (identified by URL or other identifiers) are specified in requests 202. Proxy server 122 suitably obtains the requested content from a local or remote source, as appropriate (function 206).

Requested content is received from the source (function 208) and relayed via the wireless network to the client device that initially requested the identified content (function 210). Content may be relayed from the proxy server 122 to the wireless client device 140 using a modified TCP protocol or another transport layer protocol as desired. Such a protocol would include mechanisms to detect packet loss or other network anomalies and to adapt the subsequent transmissions 210B of packets in response to the detected anomalies (function 215).

As noted above, various embodiments could react to packet loss by retransmitting previous packets, by increasing a level of forward error correction (FEC), or by otherwise increasing the amount of redundant traffic sent via the wireless network, thereby improving the probability of a complete message being received even if one or more packets become lost or corrupted due to signal attenuation, interference and/or other factors. The modified protocol may make use of TCP addressing and packet formatting schemes, if desired, or may replace TCP altogether. In a video streaming system, for example, a media player application executed by the client device 140A-B could be programmed to communicate with the proxy using a proprietary or other transport level protocol that is capable of reacting to wireless network issues. Other embodiments could address retransmissions, redundancy and/or forward error correction at higher levels, thereby allowing even more enhanced functionality. Other embodiments may be formulated in any number of other ways.

In a video streaming system, for example, a media player or other client device 140 would typically request segments of a media stream directly from a service 110 on the Internet or another network 115. Equivalently, client device 140 would request media segments from an RSDVR, LSDVR or other file streaming service available via local or wide area networks. As noted above, if data transmission issues arose due to signal attenuation, noise or other issues in the wireless network, then a TCP router such as gateway 125 and/or wireless gateway 130 would typically respond by backing off on packet transmissions, thereby potentially worsening the problem.

Proxy 122, however, can act as an intermediary between the video server no and the client 140. Client 140 and proxy 122 may discover each other via broadcast announcements on network 121 or the wireless network, through interaction with gateway 125 or with another server residing within the home network and/or on network 115, or in any other manner. Alternatively, proxy 122 can be programmed to identify requests for media segments or other traffic indicative of a client 140 on the network 121. Such requests can be automatically intercepted and processed, as desired. Alternatively, the proxy 122 could use the client's requests for content to recognize the client device 140 and to make contact with the client 140 and thereby offer up proxy services for subsequent media streaming. Other embodiments may connect client 140 and proxy 122 in any other manner.

After the client 140 recognizes the proxy 122 on the local network, then the client 140 can posit requests 202 to proxy 122 instead of directly to video server 110. The requests 202 could identify particular segments of a video stream in some implementations, although other embodiments will allow proxy 122 to select the particular segments (e.g., to select between video streams of different encoding qualities). The selected segments are then requested 206 and received 208 from the video server 110 on network 115, as desired.

As noted above, proxy 122 can forward the segments received from the network server 110 in any manner (function 201). In various embodiments, the delivery is performed in general accord with the TCP protocol, but without regard to TCP's conventional fallback and data storm avoidance mechanisms. Other embodiments could use user datagram protocols (UDP) for delivery, or any other sort of proprietary or standard protocols, which may be modified as described herein.

The particular amount of correction that is applied will vary from embodiment to embodiment. In one example, the proxy 122 monitors a received signal strength indicator (RSSI) from the wireless gateway, or as reported from the client 140. Other embodiments may simply use TCP structures for tracking lost packets or datagrams, as desired. Rather than reducing retransmits in view of lost packets or reduced RSSI, however, various embodiments instead increase the amount of retransmitted data and/or the amount of forward error correction (FEC), as appropriate. In many implementations, the amount of redundancy is increased gradually in response to the number of lost packets or other issues identified. That is, the amount of correction is typically increased gradually as conditions worsen and/or fail to improve.

Some embodiments may additionally include mechanisms for detecting actual data storms that may occur on network 121, or on the wireless network. Such mechanisms will typically monitor traffic on the wired network 121 to recognize when bandwidth becomes limited. In such cases, the retransmissions or other redundancy can be scaled back to prevent an actual data storm from occurring. In general, however, wireless networks are more likely to experience noise or attenuation issues rather than congestion, so increasing traffic rather than deceasing traffic be a more appropriate remedy for most lost transmissions. This can be accomplished through the use of a proxy server that places segment requests on behalf of clients on a wired network.

The foregoing discussion therefore considers several different systems, devices and processes/methods to improve the processing of video content or other data delivered via a wireless network. These general concepts may be expanded or modified as desired to create any number of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A data processing system comprising:
   an interface to a local area network; and
   a processor that is configured to receive requests for identified content from a client device, to obtain the identified content from a network service via the interface, and to forward the identified content to the client device via the interface, wherein the client device communicates with the local area network via a wireless network connection, wherein the processor monitors the wireless network connection for irregularities and, when the irregularities occur, adapts transmissions of the identified content to the client device by increasing redundancy of the identified content on the wireless network connection to compensate for the irregularities.

2. The data processing system of claim 1 wherein the irregularities comprise radio density interference.

3. The data processing system of claim 2 wherein the adapting comprises increasing a number of packet retransmissions to compensate for the radio density interference.

4. The data processing system of claim 1 wherein the irregularities comprise increased distance from the client device to a wireless access point resulting in packet loss on the wireless network.

5. The data processing system of claim 4 wherein the adapting comprises increasing a number of packet retransmissions to compensate for the increased distance from the client device to the wireless access point.

6. A method executable by a data processing system, the method comprising:
   receiving requests for identified content from a client device via a local area network;
   obtaining the identified content from a network service;
   monitoring a wireless network connection between the local area network and the client device to identify irregularities in the wireless network connection; and
   forwarding the identified content to the client device via the interface, wherein the forwarding comprises adapting transmissions of the identified content by increasing redundancy of the identified content on the wireless network connection to compensate for irregularities in the wireless network connection.

7. The method of claim 6 wherein the irregularities comprise radio density interference.

8. The method of claim 7 wherein the adapting comprises increasing a number of packet retransmissions to compensate for the radio density interference.

9. The method of claim 6 wherein the irregularities comprise increased distance from the client device to a wireless access point resulting in packet loss on the wireless network.

10. The method of claim 9 wherein the adapting comprises increasing a number of packet retransmissions to compensate for the increased distance from the client device to the wireless access point.

11. A method executable by a proxy device to improve data transmissions on a wireless network, the method comprising:
    receiving a request for media content from a client device, wherein the request is transmitted to the proxy device at least in part via a wireless network;
    responding to the request by requesting a segment of a media stream from a media server;
    upon receiving the requested segment of the media stream, transmitting the received segment to the client device at least in part via the wireless network;
    monitoring the delivery of the requested segment to identify irregularities on the wireless network; and
    if irregularities are identified on the wireless network, retransmitting the received segment to thereby increase the amount of traffic on the wireless network in response to the identified irregularities.

12. The method of claim 11 wherein the retransmitting comprises increasing a number of data packets transmitted on the wireless network.

13. The method of claim 11 wherein the retransmitting comprises increasing an amount of forward error correction (FEC) applied to packets transmitted on the wireless network.

14. The method of claim 11 further comprising the proxy device selecting the segment of the media stream on behalf of the client device.

15. The method of claim 11 wherein the retransmitting is performed in accordance with a modified transmission control protocol (TCP) in which retransmissions are increased rather than decreased in response to the identified irregularities to compensate for lost packets.

* * * * *